United States Patent [19]
Stolz

[11] 3,812,687
[45] May 28, 1974

[54] AIR CONDITIONING SYSTEM FOR COOLING THE INTERIOR SPACE OF MOTOR VEHICLE

[75] Inventor: Albert Stolz, Pfrondorf, Germany

[73] Assignee: Daimler-Benz Aktiengesellschaft, Stuttgart-Unterturkheim, Germany

[22] Filed: Oct. 6, 1972

[21] Appl. No.: 295,700

[30] Foreign Application Priority Data
Oct. 6, 1971   Germany............................ 2149819

[52] U.S. Cl....................... 62/323, 62/244, 62/279, 62/291, 62/305
[51] Int. Cl............................................ F25b 27/00
[58] Field of Search ............ 62/305, 291, 279, 244, 62/323

[56] References Cited
UNITED STATES PATENTS

| | | | |
|---|---|---|---|
| 2,009,882 | 7/1935 | Fourness.............................. | 62/305 |
| 2,250,612 | 7/1941 | Tanner................................ | 62/291 |
| 2,296,997 | 9/1942 | Knoy.................................... | 62/279 |
| 2,311,294 | 2/1943 | Hanson................................ | 62/208 |
| 2,362,729 | 11/1944 | Smith................................... | 62/263 |
| 2,493,141 | 1/1950 | Henney............................... | 62/305 |
| 2,667,765 | 2/1954 | Harris.................................. | 62/262 |
| 2,774,220 | 12/1956 | Heymi.................................. | 62/244 |
| 3,606,762 | 9/1971 | Anglin................................. | 62/244 |

Primary Examiner—William J. Wye
Attorney, Agent, or Firm—Craig and Antonelli

[57] ABSTRACT

An air-conditioning system for cooling the interior space of motor vehicles which consists of a compressor, of a condenser cooled by a cooling air stream as well as of an evaporator coordinated to the interior space of the motor vehicle, in which the cooling medium flowing from the compressor to the condenser in the form of hot gases is cooled prior to the entry into the condenser by means of a cooling-medium-water-heat-exchanger traversed by at least a portion of the hot gas line from the compressor to the condenser.

10 Claims, 3 Drawing Figures

AIR CONDITIONING SYSTEM FOR COOLING THE INTERIOR SPACE OF MOTOR VEHICLE

The present invention relates to a refrigeration or air-conditioning apparatus for the cooling of the interior space of motor vehicles, consisting of a compressor, of a condenser cooled by a cooling air stream as well as of an evaporator coordinated to the interior space of the motor vehicle, in which the cooling medium flowing from the compressor to the condenser in the form of hot gases by way of a hot gas line is cooled prior to the entry into the condenser.

In such prior art construction, in which the condenser is disposed in the cooling air stream located in fromt of the radiator of the water-cooled engine, an auxiliary condenser unit serves a "pre-cooler" arranged in the hot gas line, which is also air-cooled and which has to be arranged accordingly in a cooling air-stream. Since such an arrangement in the engine space is frequently not possible with the space conditions which for the most part are very constricted, especially in passenger motor vehicles, which in the final analysis are also determinative for the use of a pre-cooler, the pre-cooler is arranged in the prior art construction outside the engine space underneath the vehicle floor. This involves a considerable additional expenditure and more particularly already alone by reason of the necessary long lines or conduction paths.

The present invention, in contradistinction thereto, is concerned with the task to enable an effective pre-cooling for the hot gases in which the aforementioned difficulties are avoided.

This is achieved according to the present invention in that for purposes of cooling the hot gases, the hot gas line is conducted at least over a portion of its length through a cooling-medium-water-heat-exchanger. This construction of the pre-cooler, enables, on one hand, nearly any desired location thereof, and more particularly also in the engine space since the function and operation of such a heat-exchanger can be kept far-reachingly independent of the temperature of the ambient air. Furthermore, also the efficiency of such a heat-exchanger is better than that of the air-cooled devices used heretofore.

The use according to the present invention of a cooling-medium-water-heat-exchanger as pre-cooler becomes noticeable particularly advantageously if the engine radiator can be dimensioned relatively large and if the heat-exchanger can be included in the cooling circulatory system of the engine. This can be achieved according to the present invention in a particularly simple manner in that the hot gas pipe is conducted through at least one water box of the engine radiator, especially through the lower water box. Such a solution permits particularly short line or conduction paths.

Within the scope of a particularly advantageous embodiment in accordance with the present invention, it is appropriate to construct the cooling-medium-water-heat-exchanger as vaporization or evaporation cooler, and thus to create a pre-cooler which can be arranged with a suitable construction practically at any place on the inside of the engine space since no closed circuit cooling of the water utilized in the heat-exchanger as cooling medium is necessary but only a continuous replenishing thereof. The replenishing can take place according to the present invention at least partially by condensation water precipitating at the evaporator of the air-conditioning apparatus whence the accommodation and mounting of larger water tanks is obviated.

Since the ambient air temperature inside the engine space is frequently relatively high and still further increases especially with the use of so-called exhaust gas reactors for de-contaminating the engine exhaust gases, it is appropriate if the outer casing or jacket of the heat-exchanger, with an essentially closed type of construction containing exclusively a connection betweeen the water space and the atmosphpere, has a structure effecting a slight thermal conductivity. This is attainable, for example, by an insulation of the outer casing or jacket or also by a construction thereof in the manner of a thermos bottle.

It is assured by the aforedescribed construction of the outer casing or outer jacket that the water serving as cooling medium in the heat-exchanger can absorb essentially heat exclusively from the hot gases but not from the ambient air which would otherwise reduce the efficiency of the cooling-medium-water-heat-exchanger of the present invention.

Accordingly, it is an object of the present invention to provide an air-conditioning system for cooling interior spaces of motor vehicles which avoids by simple means the aforementioned shortcomings and drawbacks encountered in the prior art.

Another object of the present invention resides in an air-conditioning system for cooling the interior space of motor vehicles, especially of passenger motor vehicles in which the use of a pre-cooler is ensured not withstanding the constricted space conditions existing in the engine space.

A further object of the present invention resides in an air-conditioning system for motor vehicles in which long lines are obviated in the system by the ability to accommodate a pre-cooler in the engine space itself at an appropriate location.

A still further object of the present invention resides in an air-conditioning or refrigerating system for motor vehicles in which a particularly effective pre-cooling of the hot gases is made possible.

Still another object of the present invention resides in an air-conditioning system for motor vehicles in which the pre-cooler not only can be located in substantially any place of the engine space but in which the pre-cooler also offers substantially improved efficiency.

A further object of the present invention resides in an air-conditioning system for motor vehicles which is not only relatively simple in construction but additionally permits the use of a pre-cooler substantially independent of the ambient temperature.

These and other objects, features and advantages of the present invention will become more apparent from the following description when taken in connection with the accompanying drawing which shows, for purposes of illustration only, one embodiment in accordance with the present invention, and wherein.

Figure 3:
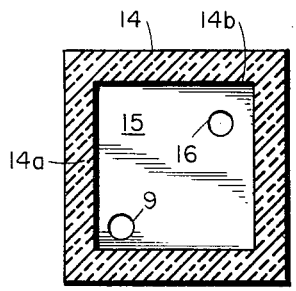
FIG. 3 is a partial sectional view taken along line II—II of FIG. 2.
Figure 1:
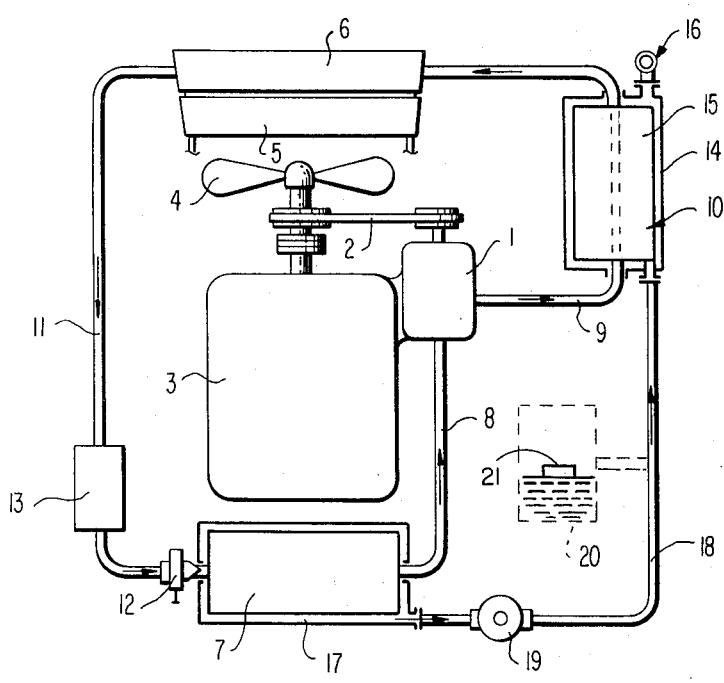
FIG. 1 is a schematic view of one embodiment of an air-conditioning apparatus in accordance with the present invention.
Figure 2:
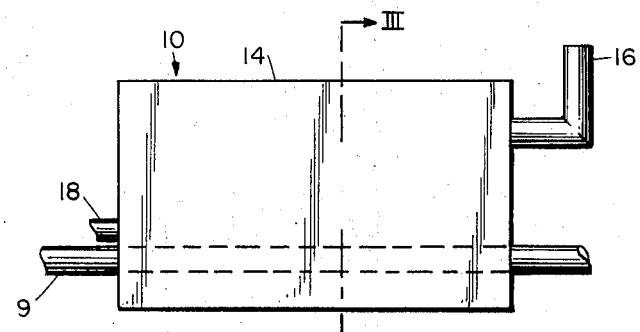
FIG. 2 is a side elevational view of the cooling-medium-water-heat-exchanger according to the present invention.

Referring now to the single FIGURE of the drawing, the air-conditioning system illustrated therein for the cooling of an interior space of a motor vehicle, which is not shown in the drawing, includes a compressor 1, which is driven from the vehicle engine 3 by way of a belt drive 2; the vehicle engine 3 is thereby constructed as conventional water-cooled internal combustion engine. The vehicle engine 3 drives additionally a fan 4 in front of which is located the engine radiator 5 disposed in the suction air stream. The condenser 6 is arranged in front of the engine radiator 5 in the illustrated embodiment so that also the condenser 6 is disposed in the suction air stream of the fan 4.

The evaporator of the air-conditioning system is designated by reference numeral 7 which, together with the condenser 6 and the compressor 1 is disposed in the cooling medium circulatory system and from which the cooling medium is conducted in gaseous condition to the compressor 1 by way of the line 8. The cooling medium present in gaseous condition is compressed in the compressor 1 whereby simultaneously a heating is produced, and the cooling medium now present as hot gas flows from the compressor 1 by way of the line 9 into the condenser 6 where it is condensed. In order to be able to get along with a relatively small condenser notwithstanding the partly relatively high temperatures of the gases compressed in the compressor 1, the hot gas is precooled in the transition from the compressor 1 to the condenser 6, for which purpose a cooling-medium-water-heat-exchanger generally designated by reference numeral 10 is provided according to the present invention in the illustrated embodiment. This cooling-medium-water-heat-exchanger 10 will be described more fully hereinafter.

After condensing the cooling medium in the condenser 6, the cooling medium is conducted by way of the line 11 and an expansion valve 12 to the evaporator 7 which is coordinated to the interior space of the vehicle (not illustrated). In the transition from the condenser 6 to the evaporator 7, the cooling medium additionally traverses a conventional intermediate reservoir or tank and drier indicated schematically by reference numeral 13.

The cooling-medium-water-heat-exchanger 10 provided in the transition from the compressor 1 to the condenser 6 is constituted in the illustrated embodiment by a vaporization or evaporator cooler which includes an outer casing or jacket 14 and whose water space 15 is traversed by the line 9 in which flows the hot gas from the conpressor 1 to the condenser 6. The outer jacket 14 with a type of construction substantially closed on all sides, includes a connection of the water space 15 with the atmosphere which is schematically indicated in the drawing by a vent pipe 16. Furthermore, the outer jacket 14 that it possesses only a slight thermal conductivity. This can be attained, for example, as shown in FIG. 3, by providing a layer of insulation 14a between the outer jacket 14 and the inner jacket 14b in order to prevent the water serving as cooling medium from being heated up by the ambient air which frequently reaches relatively high temperatures in the engine space.

The supply of the heat-exchanger 10 with water serving as cooling medium takes place in the illustrated embodiment according to the present invention at least partially by the condensation water which precipitates at the evaporator 7 with a corresponding air humidity and which is collected by a container or trough schematically indicated by reference numeral 17, from which it reaches the water space 15 by way of the line 18. If a drop from the container 17 to the heat-exchanger 10 is not present and also cannot be realized for constructive reasons, then a pump 19 present in the line 18 may be provided for the feed of the condensation water collected in the tank 17 to the water space 15.

In order to assure a sufficient supply of the heat exchanger 10 with cooling water also when condensation water does not precipitate in a sufficient quantity, a supply tank 20 may be provided from which the water space 15 can be filled. The supply of condensation water out of the tank 17 or of water present in the reservoir tank 20 to the water space 15 of the heat-exchanger 10 can be controlled by conventional control devices such as, for example, by floats 21 or the like in dependence on the water level in the water space 15.

The principle of the pre-cooling of the hot gases flowing from the compressor 1 to the condenser 6, described in connection with the illustrated embodiment may, of course, also be applied to refrigeration installations which are utilized for refrigerated trucks or which are operated as stationary installations.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims. What I claim is:

1. An air-conditioning system for the cooling of an interior space of a motor vehicle driven by an engine disposed in an engine space, comprising: a compressor, a condenser cooled by a cooling air stream, an evaporator coordinated to the interior space, a cooling medium flowing from said compressor to said condenser in the form of hot gases, a gas line interconnecting said compressor and said condenser through which the hot gases flow into said condenser, a cooling-medium-water-heat-exchanger means provided in said engine space disposed over at least a portion of said gas line for cooling the hot gases contained therein said cooling-medium-water-heat-exchanger means including a plurality of spaced walls defining an outer jacket of substantially closed construction on all sides thereof, said walls effecting slight thermal conductivity, said heat-exchanger means further including a water space disposed in said outer jacket, said outer jacket being provided with a connection between said water space and the atmosphere, and insulation means disposed between said water space and said outer jacket means for insulating said heat exchanger means from the ambient temperature in said engine space.

2. An air-conditioning system according to claim 1, wherein said heat-exchanger means is constructed as evaporative cooler.

3. An air-conditioning system according to claim 1, wherein said heat-exchanger means is constructed as vaporization cooler.

4. An air-conditioning system according to claim 1, wherein the water serving as cooling medium in the heat-exchanger means is constituted at least in part by the condensation water precipitating at the evaporator.

5. An air conditioning system according to claim 4, wherein the motor vehicle includes a fan and a radiator, said radiator and said condenser being disposed in the cooling air-stream of said fan.

6. An air-conditioning system according to claim 5, further including a water-supply tank interconnected with said water space, and means for maintaining a predetermined level of cooling-medium water in said heat exchanger means for condensate in the condenser and from said supply tank.

7. An air-conditioning system according to claim 6 wherein said heat-exchanger means is constructed as evaporative cooler.

8. An air-conditioning system according to claim 6 wherein said heat-exchanger means is constructed as vaporization cooler.

9. An air-conditioning system according to claim 1, wherein the motor vehicle includes a fan and a radiator, said radiator and said condenser being disposed in the cooling air-stream of said fan.

10. An air-conditioning system according to claim 4, further including a water supply tank interconnected with said water space, and means for maintaining a predetermined level of cooling-medium water in said heat exchanger means for condensate in the condenser and from said supply tank.

* * * * *